3,069,361
WATER-DISPERSIBLE LECITHIN

George W. Cogswell, Decatur, Ill., assignor to A. E. Staley Manufacturing Company, Decatur, Ill., a corporation of Delaware
No Drawing. Filed Aug. 12, 1960, Ser. No. 49,152
9 Claims. (Cl. 252—363.5)

This invention relates to a new lecithin composition, which is readily dispersible in an aqueous medium. It relates more particularly to a lecithin composition comprising a vegetable oil-soluble nonionic alkylated phenoxypolyether alcohol dispersing agent and lecithin.

Although lecithin is a well-known surface active agent, it is not readily dispersible in water. An object of this invention is therefore to make a new lecithin composition, which is readily dispersible in water.

I have found that vegetable oil-soluble alkylated phenoxypolyether alcohols are unique in their property of readily and permanently dispersing lecithin in water. Various other emulsifiers will disperse lecithin in water; however, if the emulsion is allowed to stand, the oil in the lecithin tends to form droplets in the aqueous system. In some cases a three-phase system results.

The lecithin of this invention may be any lecithin derived from any oil such as soybean oil, cottonseed oil, linseed oil or corn oil. The lecithin may be alcohol-soluble or alcohol-insoluble, natural, bleached or pigmented. The preferred lecithin of this invention is a bleached soybean oil lecithin. Bleached lecithin is preferred, since the ultimate lecithin composition of this invention finds its greatest utility in compositions where the presence of color in the lecithin composition interferes with the color of the composition into which the lecithin composition is incorporated. For example, the preferred composition of this invention is used as a pigment wetting and suspending agent; an additive to laundry starch as an ironing aid; an additive to remove scroop in nylon; an antistatic agent in textiles, etc. In many of these uses a colored lecithin composition would not be desirable.

The vegetable oil-soluble alkylated phenoxypolyether alcohols of this invention have the formula

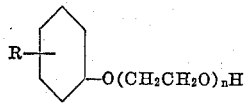

where $n$ is a number of from 2 to 24 and R is an alkyl group of from 6 to 18 carbon atoms. R can be hexyl, octyl, 2-ethylhexyl, nonyl, t-decyl . . . octadecyl. As $n$ increases from 2 to 24, the oil-solubility of the dispersing agent decreases, while as the number of carbon atoms in the alkyl group increases from 6 to 18 carbon atoms the oil-solubility of the dispersing agent increases. The preferred alkylated phenoxypolyether alcohols of this invention are those where R is octyl or nonyl and $n$ is a number of from 4 to 7. These preferred oil-soluble alkylated phenoxypolyether alcohols of this invention tend to be borderline liquids at room temperature. This borderline solid-liquid state gives these preferred dispersing agents physical properties closely resembling the physical properties of the liquid lecithin. In addition these dispersing agents have a borderline solubility in water. It is believed that these two properties account in part for the ease with which the preferred lecithin composition of this invention disperses in water and contribute greatly to the stability of the resulting emulsion. Of course, the fact that these dispersing agents are liquids facilitates their addition to liquid lecithin. The vegetable oil soluble nonionic alkylated phenoxypolyether alcohol should comprise from 1% to 10% by weight of the lecithin composition. If more than 10% by weight of the composition is dispersing agent, the composition has a tendency to foam. Further, the lecithin composition becomes too water-sensitive for some uses such as in paint formulations. With less than 1% by weight, there is difficulty in obtaining complete dispersion.

Although the use of any of the above vegetable oil-soluble dispersing agents improves the dispersion of lecithin in water, I have found that the use of an oil-soluble alkylated phenoxypolyether alcohol dispersing agent and a water-soluble, vegetable oil-insoluble alkylated phenoxypolyether alcohol dispersing agent results in synergism. The water-soluble, oil-insoluble nonionic dispersing agents have the formula

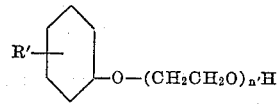

wherein R' is an alkyl group of from 6 to 18 carbon atoms and $n'$ is a number of from 8 to 120. Although the alkyl group of the vegetable oil-soluble dispersing agent and the alkyl group of the oil-insoluble, water-soluble dispersing agent may be different, it is preferable that both alkyl groups have the same number of carbon atoms. Accordingly, it has been found that when the preferred vegetable oil-soluble nonylphenoxypolyoxyethylene alcohol, having from 4 to 7 oxyethylene units, is used with a water-soluble, oil-insoluble nonylphenoxypolyoxyethylene alcohol, having from 13 to 17 oxyethylene units (solidifies at 68° F.), the optimum synergistic effect is produced. It is my belief that the dispersing agent having from 4 to 7 oxyethylene units renders the dispersing agent having from 13 to 17 oxyethylene units more compatible with the lecithin and any oil it may contain, while the dispersing agent having from 13 to 17 oxyethylene units renders the lecithin more compatible with the aqueous medium than the dispersing agent having from 4 to 7 oxyethylene units alone. While this same theory applies to the use of any vegetable oil-soluble nonionic alkylated phenoxypolyether alcohol dispersing agent and any water-soluble, vegetable oil-insoluble nonionic alkylated phenoxypolyether alcohol dispersing agent, these dispersing agents appear to be particularly efficacious because of the close chemical and physical similarity of the two dispersing agents, which differ only in the number of oxyethylene units. This results in an unusally well-balanced lecithin dispersing system. The ratio of vegetable oil-soluble dispersing agent to water-soluble, vegetable oil-insoluble dispersing agent should range from 90 parts to 10 parts up to 10 parts to 90 parts by weight. However, the best results are obtained when the ratio is 50:50. As in the case where only the vegetable oil-soluble dispersing agent is used, from 1% to 10% by weight of the lecithin composition should be dispersing agent.

The following examples are merely illustrative and should not be construed as limiting the scope of this invention.

EXAMPLE 1

Ninety-three grams of bleached soybean oil lecithin was weighed into each of six beakers. Seven grams of dispersing agent, as tabulated in the table below, was added to each of the liquid, bleached-lecithin samples and stirred for ten minutes. Eight grams of each of these compositions was weighed into a 600 ml. beaker. Immediately after 392 ml. of water was added to each beaker, it was stirred with a magnetic stirrer for 5 minutes. At this point the visual character of the aqueous system was recorded.

*Table I*

| Grams | Dispersing Agent | Comments |
|---|---|---|
| 7 | Tamol 731—Sodium salt of condensed aryl sulfonic acid. | Not all lecithin and oil dispersed. |
| 7 | Butyl Carbitol | All lecithin and oil dispersed. |
| 7 | $C_9H_{19}$—⬡—$O$—$(CH_2CH_2O)_{15}H$ | Oil droplets distributed throughout water. |
| 7 | $C_9H_{19}$—⬡—$O$—$(CH_2CH_2O)_6H$ | All lecithin and oil dispersed. |
| 3½ | $C_9H_{19}$—⬡—$O$—$(CH_2CH_2O)_{15}H$ | Do. |
| 3½ | $C_9H_{19}$—⬡—$O$—$(CH_2CH_2O)_6H$ | Do. |
| 7 | $C_9H_{19}$—⬡—$O$—$(CH_2CH_2O)_4H$ | Do. |

Each of the lecithin compositions containing a nonionic vegetable oil-soluble dispersing agent was a homogeneous dispersion.

EXAMPLE 2

In order to compare the speed with which various alkylated phenoxypolyether alcohols disperse lecithin in water, four of the lecithin compositions of Example 1 were compared using the same method as in Example 1. In this example, the mixture was considered completely dispersed when no residue remained on the bottom of the beaker.

*Table II*

| Disbursing Agent | Grams | Time, seconds |
|---|---|---|
| Butyl Carbitol | 7 | 180 |
| $C_9H_{19}$—⬡—$O$—$(CH_2CH_2O)_6H$ | 7 | 145 |
| $C_9H_{19}$—⬡—$O$—$(CH_2CH_2O)_6H$ | 3.5 | 79 |
| $C_9H_{19}$—⬡—$O$—$(CH_2CH_2O)_{15}H$ | 3.5 | 79 |
| $C_9H_{19}$—⬡—$O$—$(CH_2CH_2O)_{15}H$* | 7 | 55 |

*Although little or no residue remained on the bottom, oil droplets were distributed throughout the mixture. This sample was stirred for an additional four minutes with no change. On standing an oil film formed in contradistinction to the other three compositions, which remained completely dispersed.

EXAMPLE 3

Ninety-three grams of bleached soybean oil lecithin was weighed into each of five beakers. Seven grams of dispersing agent, as tabulated in the table below, was added to each of the liquid, bleached-lecithin samples and stirred for ten minutes. Two grams of each of these compositions was weighed into a 150 ml. beaker. The mixture was considered completely dispersed when no residue remained on the bottom of the beaker, which contained 98 grams water.

*Table III*

| Dispersing Agent | Grams | Time, sec. | Comment |
|---|---|---|---|
| $C_8H_{17}$—⬡—$O$—$(CH_2CH_2O)_9H$* | 7 | 120 | Minute oily particles settled to bottom. |
| $C_{12}H_{25}$—⬡—$O$—$(CH_2CH_2O)_{10}H$* | 7 | 120 | Do. |
| $C_9H_{19}$—⬡—$O$—$(CH_2CH_2O)H$ | 3.5 | 99 | Smooth emulsion. |
| $C_9H_{19}$—⬡—$O$—$(CH_2CH_2O)_{15}H$ | 3.5 | 99 | No oil droplets. |
| $C_8H_{17}$—⬡—$O$—$(CH_2CH_2O)_9H$ | 3.5 | 105 | Oily film forms on standing one minute. |
| $C_9H_{19}$—⬡—$O$—$(CH_2CH_2O)_{15}H$ | 3.5 | 105 | |
| $C_8H_{17}$—⬡—$O$—$(CH_2CH_2O)_9H$ | 3.5 | 125 | Smooth emulsion. |
| $C_9H_{19}$—⬡—$O$—$(CH_2CH_2O)_6H$ | 3.5 | 125 | No oil droplets. |

*These dispersing agents are somewhat oil-soluble as well as water-soluble; they are useful primarily with lecithin of relatively low oil content and are not as effective with lecithin of relatively high oil content.

EXAMPLE 4

A lecithin composition containing 90 parts lecithin, 5 parts $C_9H_{19}$—⬡—$O$—$(CH_2CH_2O)_6H$ and 5 parts $C_9H_{19}$—⬡—$O$—$(CH_2CH_2O)_{15}H$ was prepared by the method set forth in Example 1. Two grams of this sample formed a smooth dispersion in 98 grams water after stirring for 75 seconds.

EXAMPLE 5

Example 4 was repeated using 96 parts lecithin and 2 parts of each of the nonionic dispersing agents used in said example. The lecithin was suspended after three minutes stirring.

EXAMPLE 6

Example 4 was repeated using 99 parts lecithin and ½ part of each of the nonionic dispersing agents used in said example.

As used herein the term "lecithin" has its commercial meaning and refers to a group of crude materials containing a mixture of phospholipins as the primary ingredient and may also contain, among other ingredients, minor quantities of glyceride oil and free fatty acid.

Since many embodiments of this invention may be made and since many changes may be made in the embodiments described, the foregoing is to be interpreted as illustrative only and my invention is defined by the claims appended hereafter.

I claim:

1. An aqueous dispersible lecithin composition comprising from 90 to 99 parts by weight lecithin and from 10 to 1 parts by weight of a vegetable oil-soluble nonionic alkylated phenoxy compound having the formula

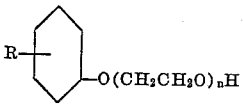

wherein R is an alkyl group of from 6 to 18 carbon atoms and $n$ is a number of from 2 to 24.

2. The lecithin composition of claim 1 wherein R is selected from the group consisting of octyl and nonyl, and $n$ is a number of from 4 to 7.

3. The lecithin composition of claim 1 wherein the vegetable oil-soluble nonionic alkylated phenoxy compound has the formula

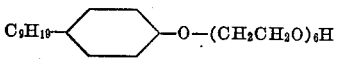

4. An aqueous dispersible composition comprising from 90 to 99 parts by weight lecithin and from 10 to 1 parts by weight of a nonionic dispersing agent comprising from 10 to 90 parts by weight of a vegetable oil-soluble nonionic alkylated phnoxy compound having the formula

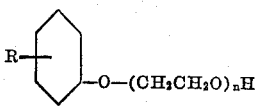

wherein R is an alkyl group of from 6 to 18 carbon atoms and $n$ is a number of from 2 to 24; and from 90 to 10 parts by weight of a water-soluble, vegetable oil-insoluble nonionic alkylated phenoxy compound having the formula

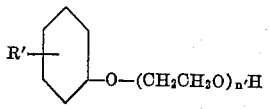

wherein R' is an alkyl group of from 6 to 18 carbon atoms and $n'$ is a number of from 8 to 120.

5. The lecithin composition of claim 4 wherein R and R' are the same and are selected from the group consisting of octyl and nonyl.

6. The lecithin composition of claim 4 wherein the vegetable oil-soluble nonionic alkylated phenoxy compound has the formula

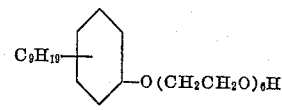

and the water-soluble, vegetable oil-insoluble nonionic alkylated phenoxy compound has the formula

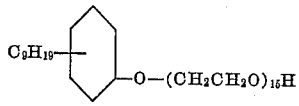

7. The lecithin composition of claim 5 wherein $n$ is a number of from 4 to 7 and $n'$ is a number of from 13 to 17.

8. The lecithin composition of claim 6 wherein the vegetable oil-soluble nonionic alkylated phenoxy compound and the water-soluble, vegetable oil-insoluble nonionic compound are present in the nonionic dispersing agent in equal parts by weight.

9. An aqueous dispersible lecithin composition comprising approximately 93 parts by weight lecithin, approximately 3½ parts by weight

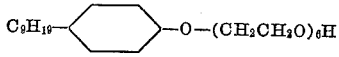

and approximately 3½ parts by weight

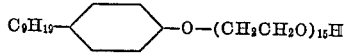

References Cited in the file of this patent

UNITED STATES PATENTS

| | | |
|---|---|---|
| 2,062,782 | Epstein et al. | Dec. 1, 1936 |
| 2,296,933 | Jordan | Sept. 29, 1942 |
| 2,661,334 | Lummus | Dec. 1, 1953 |

FOREIGN PATENTS

| | | |
|---|---|---|
| 716,641 | Great Britain | Oct. 14, 1954 |

UNITED STATES PATENT OFFICE
CERTIFICATE OF CORRECTION

Patent No. 3,069,361            December 18, 1962

George W. Cogswell

It is hereby certified that error appears in the above numbered patent requiring correction and that the said Letters Patent should read as corrected below.

Column 4, Table III, column 1, line 3 thereof, the formula should appear as shown below instead of as in the patent:

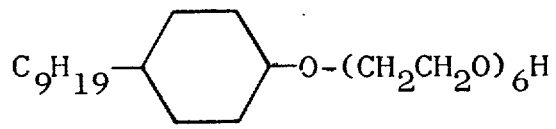

Column 5, line 48, for "phnoxy" read -- phenoxy --.

Signed and sealed this 20th day of August 1963.

(SEAL)
Attest:
ERNEST W. SWIDER
Attesting Officer

DAVID L. LADD
Commissioner of Patents